United States Patent
Kato et al.

(10) Patent No.: US 9,430,485 B2
(45) Date of Patent: Aug. 30, 2016

(54) INFORMATION PROCESSOR AND BACKUP METHOD

(71) Applicant: FUJITSU LIMITED, Kawasaki-shi, Kanagawa (JP)

(72) Inventors: Norihito Kato, Yokohama (JP); Nobuhiro Takano, Machida (JP); Norichika Imamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 226 days.

(21) Appl. No.: 14/073,259

(22) Filed: Nov. 6, 2013

(65) Prior Publication Data

US 2014/0172802 A1  Jun. 19, 2014

(30) Foreign Application Priority Data

Dec. 14, 2012 (JP) ................ 2012-273115

(51) Int. Cl.
*G06F 17/30* (2006.01)
*G06F 11/14* (2006.01)

(52) U.S. Cl.
CPC ..... *G06F 17/30088* (2013.01); *G06F 11/1446* (2013.01)

(58) Field of Classification Search
USPC ............... 707/649, 610, 640, 661, 674, 694
See application file for complete search history.

(56) References Cited

U.S. PATENT DOCUMENTS

| 8,214,367 B2* | 7/2012 | Baratto et al. ............... 707/739 |
| 9,075,755 B1* | 7/2015 | Haase ................ G06F 11/1456 |
| 2005/0198083 A1 | 9/2005 | Saika et al. |
| 2005/0223170 A1 | 10/2005 | Ushijima et al. |
| 2005/0262316 A1 | 11/2005 | Obayashi et al. |
| 2009/0265706 A1* | 10/2009 | Golosovker .......... G06F 9/4856 718/1 |
| 2014/0089264 A1* | 3/2014 | Talagala .............. G06F 11/1471 707/649 |

FOREIGN PATENT DOCUMENTS

| JP | 2005-250676 | 9/2005 |
| JP | 2005-292865 | 10/2005 |
| JP | 2005-332067 | 12/2005 |

* cited by examiner

*Primary Examiner* — Sana Al Hashemi
(74) *Attorney, Agent, or Firm* — Staas & Halsey LLP

(57) ABSTRACT

An information processor coupled to a storage apparatus that stores information, includes: a creation unit configured to create a snapshot of a file system that manages first information stored in the storage apparatus and to output the snapshot to the storage apparatus; a writing unit configured to write second information stored in cache memory onto the storage apparatus after the snapshot has been created; and a replication instruction unit configured to instruct the storage apparatus to create a replication of the first information stored in the storage apparatus after the second information has been written and the snapshot.

13 Claims, 16 Drawing Sheets

INFORMATION PROCESSOR AND BACKUP METHOD

CROSS-REFERENCE TO RELATED APPLICATION

This application is based upon and claims the benefit of priority from the prior Japanese Patent Application No. 2012-273115 filed on Dec. 14, 2012, the entire contents of which are incorporated herein by reference.

FIELD

Embodiments discussed herein are related to backup and restoration of information performed by an information processor.

BACKGROUND

As regards backup restoration in a disk array apparatus coupled to a server, the backup restoration is performed using a function that copies a disk area in the disk array apparatus into another disk in the same apparatus while stopping input and output (I/O).

Related art is disclosed in Japanese Laid-open Patent Publication No. 2005-332067, Japanese Laid-open Patent Publication No. 2005-292865, and Japanese Laid-open Patent Publication No. 2005-250676.

SUMMARY

According to one aspect of the embodiments, an information processor coupled to a storage apparatus that stores information, includes: a creation unit configured to create a snapshot of a file system that manages first information stored in the storage apparatus and to output the snapshot to the storage apparatus; a writing unit configured to write second information stored in cache memory onto the storage apparatus after the snapshot has been created; and a replication instruction unit configured to instruct the storage apparatus to create a replication of the first information stored in the storage apparatus after the second information has been written and the snapshot.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
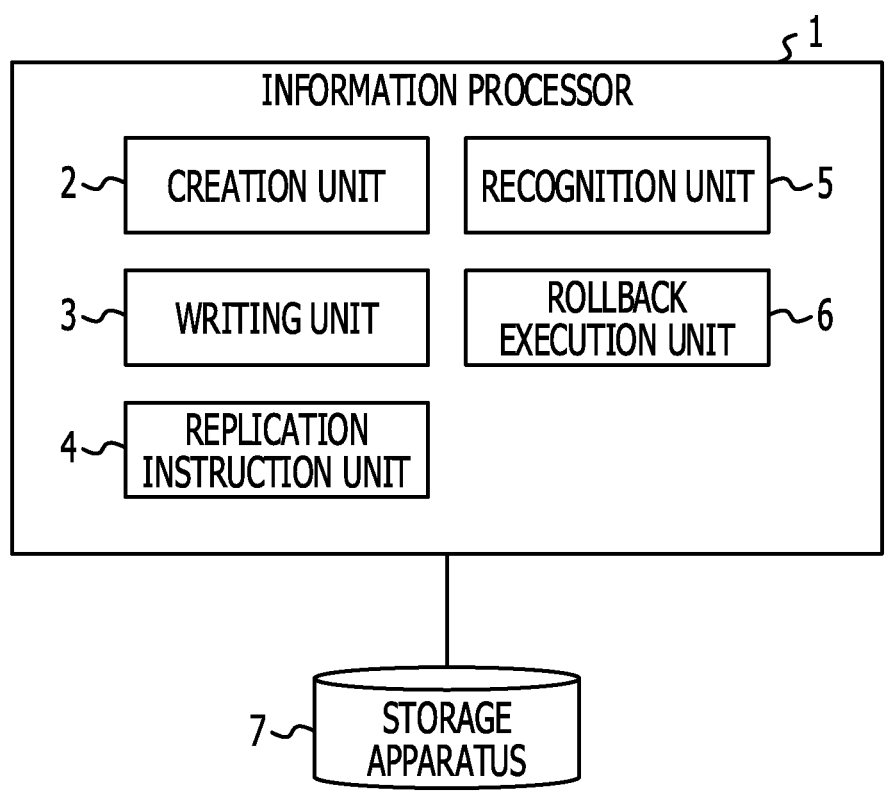
FIG. 1 illustrates an example of an information processor.

In a disk array apparatus, a data update after acquisition of a snapshot is performed in an update data storage disk apparatus, which is a storage area physically different from a disk apparatus that stores original data. Accordingly, the disk array apparatus causes a backup apparatus to acquire a backup through sequential reading from an area of a disk of the update data storage disk apparatus without distributing a storage area of the snapshot.

The disk array apparatus on a regular site manages backup data of a main volume over a plurality of generations based on a differential snapshot. Differential data of the main volume and a main pool is transferred from the regular site to a secondary site at a certain timing. The secondary site holds a secondary volume, which is a copy of the main volume, and a secondary pool, which is a copy of the main pool. Generation management information is also transferred from the regular site to the secondary site. The generation management information includes a differential bitmap table and a save destination address management table. The secondary site holds a copy of the generation management information. Thus, the whole including the generation management information is backed up and fault tolerance is enhanced.

A main volume group includes a primary volume and a differential volume. A secondary volume group includes a primary volume and a differential volume. For example, when the differential snapshots of the plurality of generations are accumulated in the differential volume and the utilization rate reaches a certain value, a request for acquisition of a new snapshot is transmitted. Each of the volume groups is synchronized based on a volume snapshot and then split. After the split, the differential volume is initialized and the secondary volume group is backed up. Thus, a new differential snapshot is created and held in the differential volume.

For example, when the backup of the disk array apparatus is performed while continuing an business processing without stopping the input and output, data being written may be incompletely written onto the disk. When data on a file system remains on a cache and is not written onto a physical disk, the snapshot taken by the disk array apparatus, such as the data on the physical disk, differs from an image on the file system. Thus, the consistency of the data may fail to be maintained on the disk and the state at the time of the backup may fail to be completely restored.

Since in the backup restoration, copying is performed using a resource of the disk array apparatus, use of a resource of a server, such as a central processing unit (CPU), may be undesired at the time of the copying. Since the input and output to the disk array apparatus are stopped in order to ensure the consistency of the backup data, the backup restoration may be performed offline.

In the backup of a storage coupled to a server, a snapshot is utilized such that data of the moment at which the snapshot is taken in the same storage is copied as a link to actual data and is backed up instantly. In this manner, the backup restoration may be performed.

In the backup of the storage coupled to the server, a complete copy of the actual data is created in the same storage with respect to what the snapshot is taken for. In this manner, the backup restoration may be performed.

The consistency of the data may fail to be maintained on the disk and the state at the time of the backup may fail to be completely restored. In order to maintain the consistency of the data, it is desired to stop the input and output to the disk at the time of the backup. A file system like a Zettabyte File System (ZFS) does not have a function that stops the input and output. Since an application or business is stopped in order to stop the input and output in the file system, no online backup may be performed.

The online backup may be performed by taking a snapshot, which is an image of the file system. Since the data of the snapshot is linked to the actual data, when, for example, data loss caused by disk failure or the like occurs, the data of the snapshot may be lost as well.

The online backup may be performed by copying the actual data of the snapshot into another disk. In the backup restoration for which no disk array apparatus is used, a resource of an business server is used and thus, other businesses may be affected.

FIG. 1 illustrates an example of an information processor. An information processor 1 is coupled to a storage apparatus 7 that stores information. The information processor 1 includes a creation unit 2, a writing unit 3, and a replication instruction unit 4.

The creation unit 2 creates a snapshot of a file system that manages first information stored in the storage apparatus 7 and outputs the snapshot to the storage apparatus 7. The creation unit 2 may correspond to, for example, a file system 19, or a control unit 15 that instructs the file system 19 to create a snapshot.

The writing unit 3 writes second information stored in cache memory onto the storage apparatus 7 after the creation of the snapshot. The writing unit 3 may correspond to, for example, an operating system (OS) 18, or the control unit 15 that instructs the OS 18 to perform writing.

The replication instruction unit 4 instructs the storage apparatus 7 to create a replication of the first information, which is held by the storage apparatus 7 after the second information has been written, and the snapshot. The replication instruction unit 4 may correspond to, for example, a controller 29, or the control unit 15 that gives instructions to the controller 29.

When the input and output (I/O) to the storage apparatus are performed in an environment of a file system having no I/O stop function or without stopping the I/O, the backup may be performed with the integrity of the data at the time of the backup.

The information processor 1 further includes a recognition unit 5 and a rollback execution unit 6. The recognition unit 5 recognizes information resulting from replicating the snapshot and the first information, onto which the second information is written after the creation of the snapshot, as a file system. The recognition unit 5 may be the OS 18 that performs the recognition based on, for example, the instructions of the control unit 15.

The rollback execution unit 6 executes rollback based on the snapshot. The rollback execution unit 6 may be the file system 19 that performs the rollback based on, for example, the instructions of the rollback execution unit 6.

The restoration may be performed using the backup data having the integrity of the data at the time of the backup and the data may be returned to the state at the time of the backup.

Figure 2:
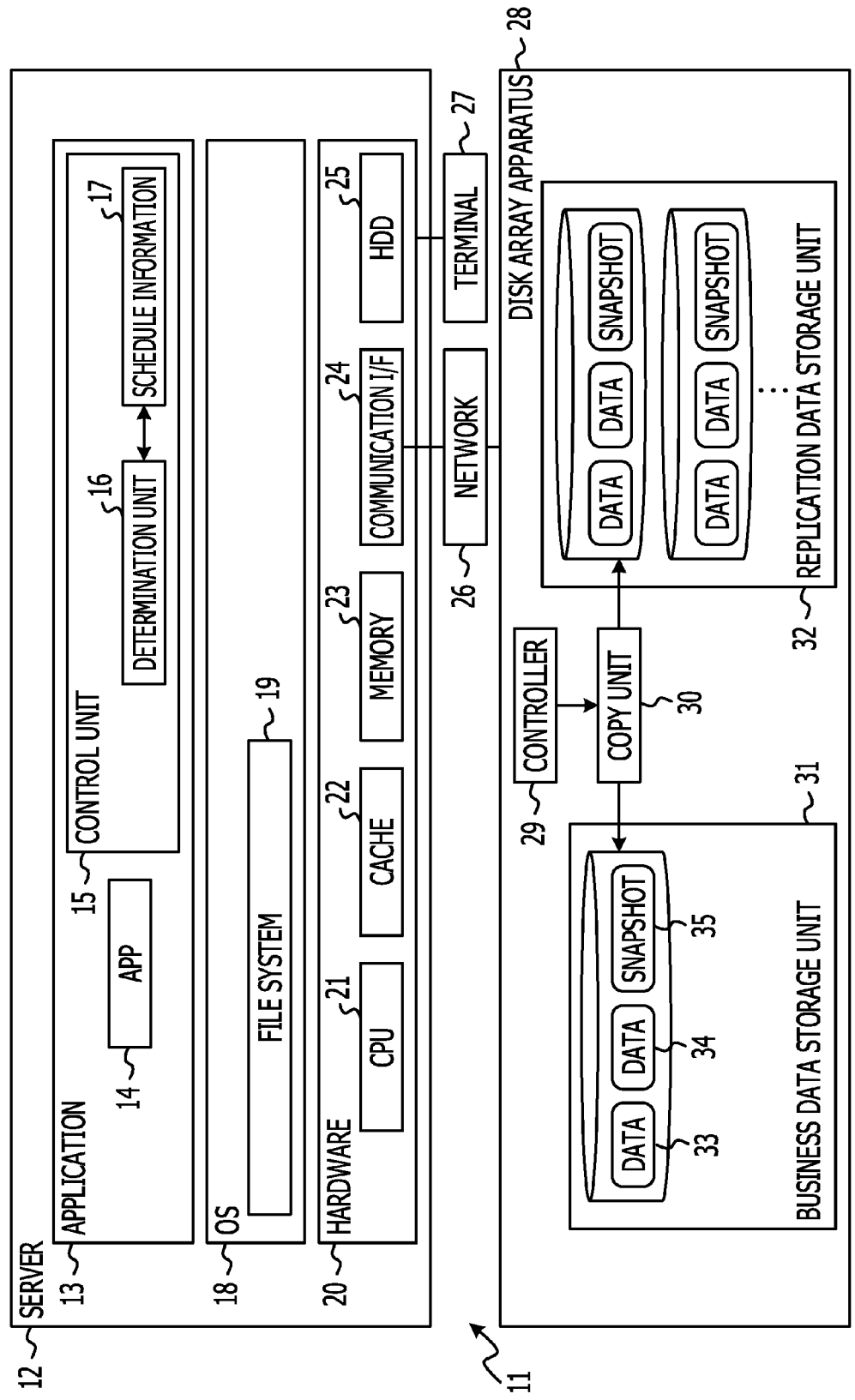
FIG. 2 illustrates an example of a server storage system.

FIG. 2 illustrates an example of a server storage system. In a server storage system 11, the backup restoration of the data is performed online without stopping the input and output from a server 12 to a storage apparatus. The server storage system 11 includes the server 12 and a disk array apparatus 28, which is the storage apparatus. The server 12 and the disk array apparatus 28 are coupled via a communication network 26. The server storage system 11 may be provided with a backup apparatus or a backup server.

The server 12 may be a server that executes an application software program, which is hereinafter referred to as an application or an app, 13 to perform an business processing. The server 12 is coupled to an information processing terminal 27 for inputting a command or data to the server 12. The server 12 includes a hardware 20, such as a CPU 21, cache memory 22, which is hereinafter referred to as a cache 22, memory 23, a communication interface (I/F) 24, and a hard disk drive (HDD) 25. The CPU 21, the cache 22, the memory 23, the communication I/F 24, and the HDD 25 are coupled via a bus. The HDD 25 is a mass storage device and stores the OS 18, an application 13, and the like.

The CPU 21 reads the OS 18 or the application 13 from the HDD 25 and executes a certain process. When the CPU 21 reads and executes a program, the creation unit 2, the writing unit 3, the replication instruction unit 4, the recognition unit 5, and the rollback execution unit 6 are operated.

The memory 23 is a storage device that stores data temporarily. The cache 22 may be a storage device with a speed higher than the speed of the memory 23 and with a capacity smaller than the capacity of the memory 23. The communication I/F 24 is coupled to the communication network 26 and may be an interface for communicating with a device coupled to the communication network 26.

The OS 18 includes the file system 19. The file system 19 is used for managing data recorded in the storage device. The file system 19 may have no I/O stop function. The file system 19 operates on the server 12. The target data to be backed up is managed in the file system 19. The file system 19 includes a snapshot function and a rollback function. The snapshot function serves to take a data image on the file system 19 at a certain moment. The rollback function serves, using the snapshot that has previously been taken on the file system 19, to return the file system to the state at the time at which the snapshot has been taken. The data managed by the file system 19 is saved in a physical disk on the disk array apparatus 28 and is partially present on the cache 22.

The cache 22 temporarily saves the data written onto the file system 19 having no I/O stop function. Since in the cache 22, a process is performed with a speed higher than the speed for the saving into the physical disk on the disk array apparatus 28, the writing may be performed at a high speed. The data present only on the cache is not present on the disk array apparatus 28. Thus, when the information stored in an business data storage unit 31 is copied in this state into a replication data storage unit 32 by the copy function of the disk array apparatus 28, the data on the cache 22 is not copied into the replication data storage unit 32.

The application 13 includes an app 14 for businesses, a control program, and the like. The CPU 21 may function as the control unit 15 by reading and executing a control program.

The control unit 15 instructs the file system 19 used in the OS 18 or the controller 29 present in the disk array apparatus 28 to start to execute various functions including taking a snapshot and giving instructions for the copying among disks. The control unit 15 may include a determination unit 16 or schedule information 17.

The determination unit 16 determines a timing for taking the snapshot using the schedule information 17 and then determines a timing for writing the data on the cache 22 onto the physical disk of the disk array apparatus 28.

A schedule, which includes a start time of taking the snapshot and a start time of the copying from the business data storage unit 31 into the replication data storage unit 32, is registered in the schedule information 17 and managed based on a snapshot flag and a copy flag. The schedule information 17 includes a management item for managing the entire schedule. The schedule information 17 may be, for example, a table of n days or a table of a few weeks.

The disk array apparatus 28 is provided with a plurality of physical disks, includes a controller that manages the plurality of physical disks, and has characteristics of a high speed, a large capacity, and high reliability. The disk array apparatus 28 includes the controller 29, a copy unit 30, and the physical disks, which are the business data storage unit 31 and the replication data storage unit 32.

The controller 29 manages the plurality of the physical disks. Based on the instructions of the control unit 15 present on the server 12, the controller 29 requests the copy unit 30 to copy the data included in the physical disk from the business data storage unit 31 into the replication data storage unit 32 or from the replication data storage unit 32 into the business data storage unit 31.

When the copy unit 30 receives the request from the controller 29, the copy unit 30 reads the data from the designated physical disk and writes the data onto another designated physical disk. The physical disks are physical disks of the disk array apparatus 28 and include the business data storage unit 31 that stores the business data and the replication data storage unit 32.

The communication network 26 couples the server 12 and the disk array apparatus 28. The communication network 26 may be a Fiber Channel (FC), a Serial Attached SCSI (SAS), an Internet Small Computer System Interface (iSCSI), a Fiber Channel over Ethernet (FCoE), or the like.

Figure 3:
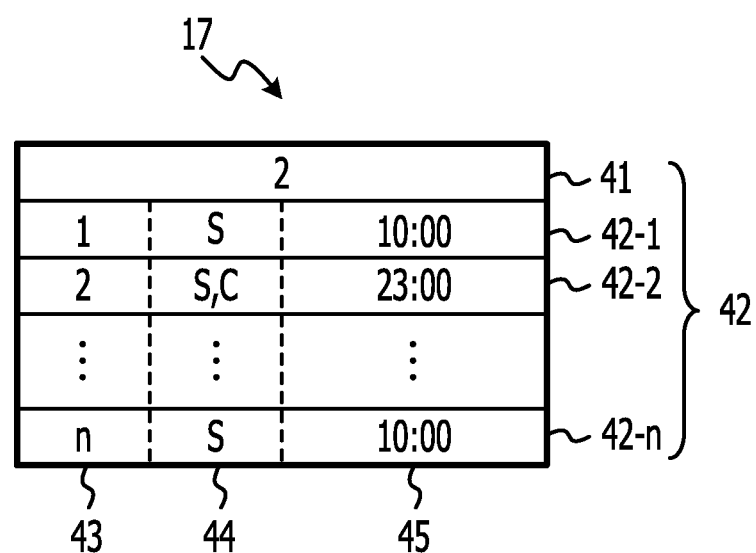
FIG. 3 illustrates an example of schedule information.

FIG. 3 illustrates an example of schedule information. The schedule information 17 includes a schedule management item 41 and schedule entries 42-1, 42-2, . . . , and 42-n. The schedule entries 42-1, 42-2, . . . , and 42-n may be referred to as the schedule entries 42. The schedule management item 41 may be an item for managing which one of the schedule entries 42 is active.

The schedule entries 42 may be information for managing the start time of taking the snapshot and the start time of the copying from the business data storage unit 31 into the replication data storage unit 32. The schedule entries 42 include data items of "entry identification information" 43, a "flag" 44, and a "start time" 45. The "entry identification information" 43 may be information for identifying the schedule entries. The entry identification information on the schedule entry that is currently active is set for the schedule management item 41. The snapshot flag (S), the copy flag (C), or none (N) may be set for the "flag" 44. The start time for the snapshot or the copying may be set for the "start time" 45.

Figure 4:
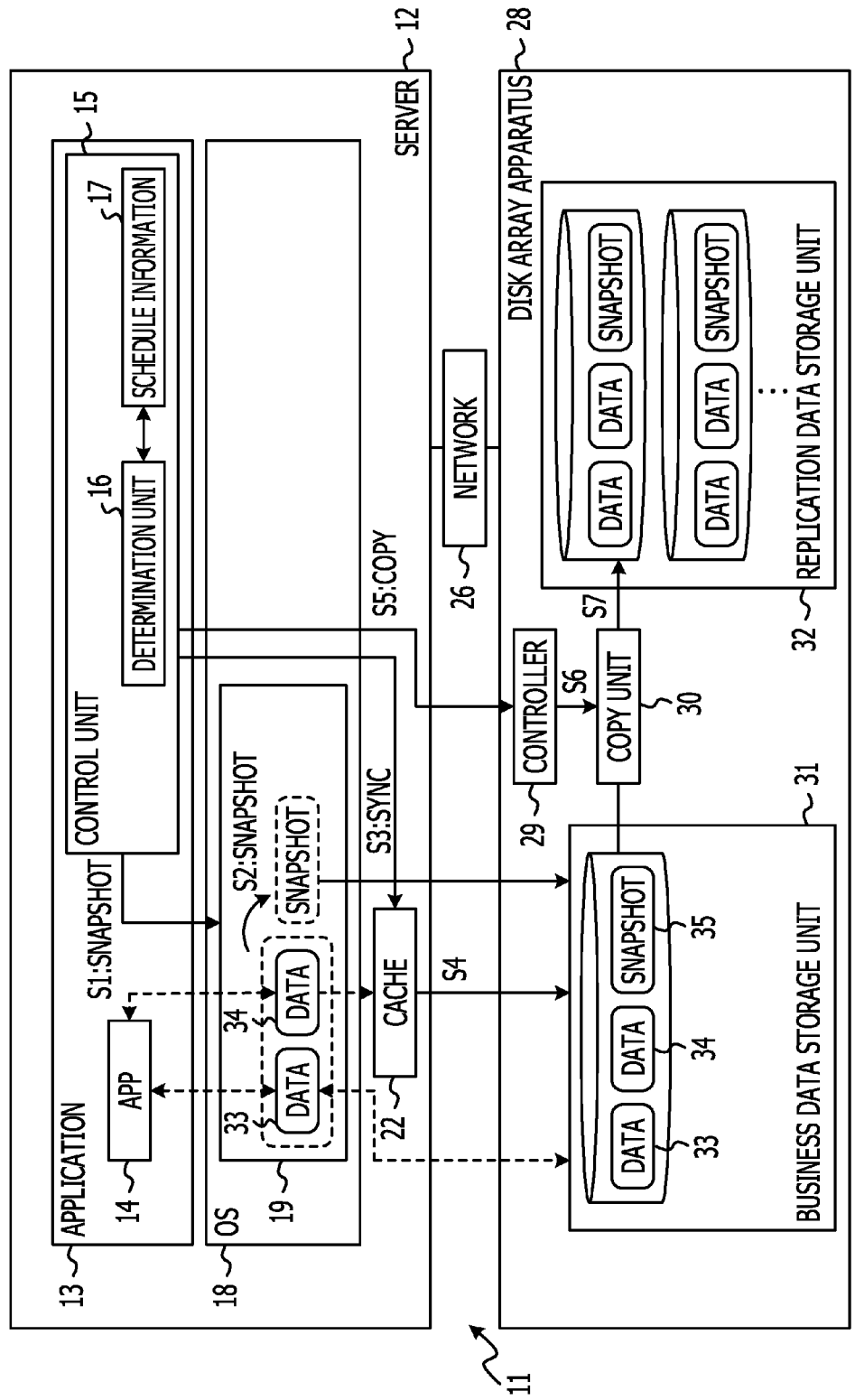
FIG. 4 illustrates an example of a system process at a time of backup.

FIG. 4 illustrates an example of a system process at a time of the backup. In FIG. 4, solid line arrows indicate backup procedures and broken line arrows indicate a flow data processing performed online. Data 33 directly written from the app 14 via the file system 19 is stored in the business data storage unit 31 of the disk array apparatus 28. Data 34, which is saved temporarily from the app 14 into the cache 22 via the file system 19 and written from the cache 22, is stored in the business data storage unit 31.

A snapshot 35 of the file system 19 has been taken before the data is copied by the disk array apparatus 28. The data on the cache 22 has been written onto the physical disk before the data is copied by the disk array apparatus 28. Using the copy function of the disk array apparatus 28, the data and the snapshot stored in the business data storage unit 31 are copied from the business data storage unit 31 into the replication data storage unit 32.

In accordance with the schedule 17, the determination unit 16 notifies the control unit 15 of the creation of the snapshot or the timing for writing the data on the cache onto the physical disk. In accordance with the notification from the determination unit 16, the control unit 15 instructs the file system 19 to create the snapshot (S1). Based on the instructions from the control unit 15, the file system 19 creates the snapshot of the file system 19 and outputs the snapshot to the business data storage unit 31 (S2).

In accordance with the notification from the determination unit 16, the control unit 15 instructs the cache 22 to write the data on the cache 22 onto the physical disk of the disk array apparatus 28 (S3). The cache 22 writes the data on the cache 22 onto the physical disk, which is the business data storage unit 31 (S4).

The control unit 15 instructs the controller 29 to copy the data from the business data storage unit 31 into the replication data storage unit 32 (S5). The controller 29 instructs the copy unit 30 to copy the data and the snapshot, which are stored in the business data storage unit 31, from the business data storage unit 31 into the replication data storage unit 32 (S6). The copy unit 30 copies the data 33, the data 34, and the snapshot 35, which are stored in the business data storage unit 31, from the business data storage unit 31 into the replication data storage unit 32 (S7).

The control unit 15 takes the snapshot for the target data to be backed up on the disk array apparatus 28, which is managed in the file system 19. Thus, an image of the file system at a desired timing may be taken online without stopping the I/O.

The file system 19 writes the data on the cache 22 onto the physical disk and writes all the data that the file system 19 is instructed to write onto the physical disk. Even when the copying is performed by the disk array apparatus 28, the backup may be performed online without stopping the I/O by combining the writing process and the copy function of the disk array apparatus.

Figure 5:
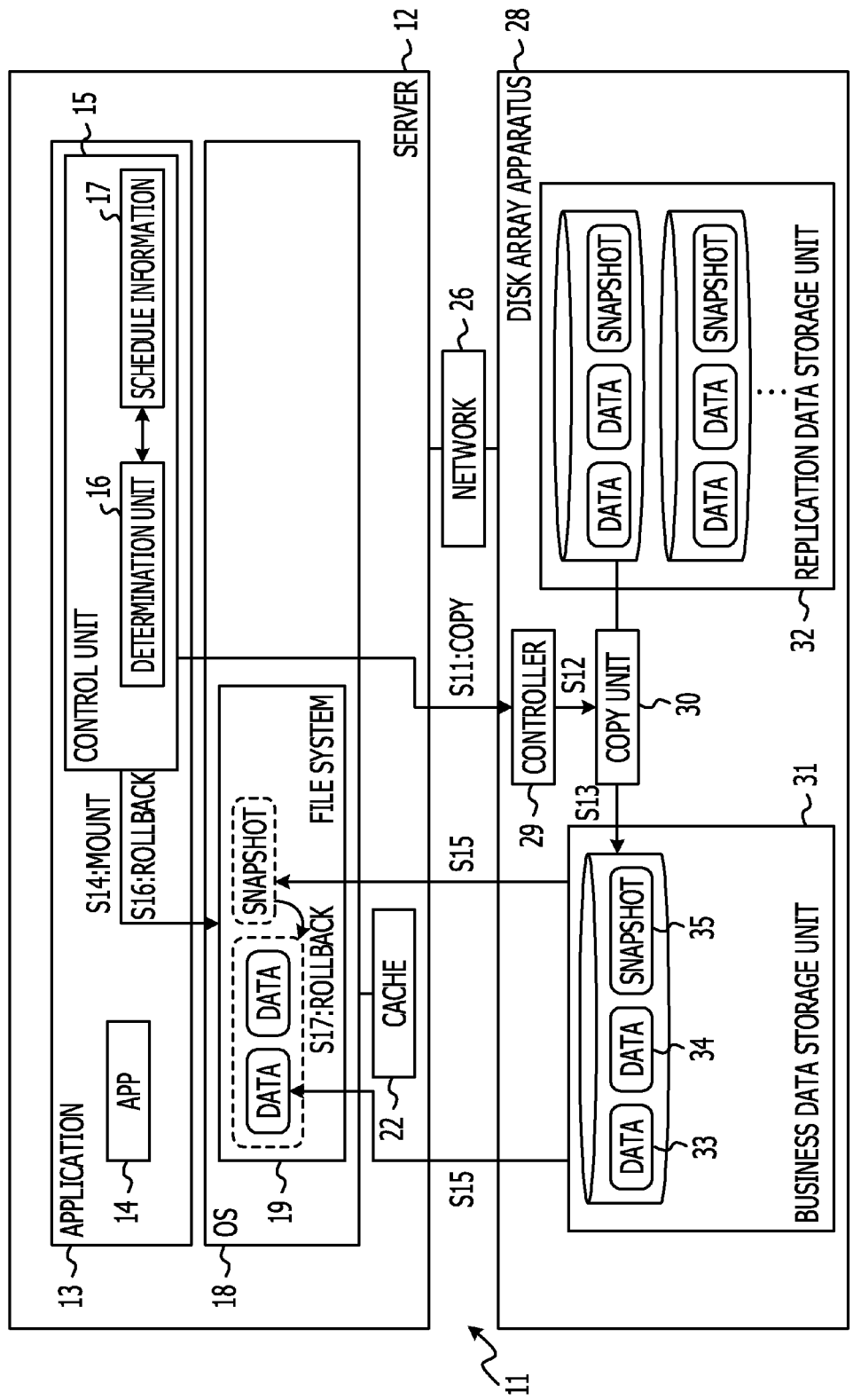
FIG. 5 illustrates an example of a system process at a time of restoration.

FIG. 5 illustrates an example of a system process at a time of restoration. In FIG. 5, solid line arrows indicate the restoration procedures. In FIG. 5, among one or more sets of the data and the snapshot, one of the sets of the data and the snapshot is copied from the replication data storage unit 32 into the business data storage unit 31 by using the copy function of the disk array apparatus 28 is used. The server 12 mounts the data and the snapshot copied into the business data storage unit 31. Because of the mounting, the consistency of the data may fail to be maintained and the state may fail to return to the state at the time of taking the snapshot. Thus, the state returns to the state at the time of taking the snapshot by performing the rollback on the snapshot. In connection with the snapshot, for example, guaranteed data may be restored using the characteristics that ensure the consistency of the data at the time of taking the snapshot under a ZFS snapshot command and the rollback function of the ZFS. When the snapshot is included in the restored data, the process illustrated in FIG. 5 may be performed.

The replication data storage unit 32 may store one or more sets of the data 33 and 34 and the snapshot 35. The control unit 15 instructs the controller 29 to copy one of the sets of the data 33 and 34 and the snapshot 35 from the replication data storage unit 32 into the business data storage unit 31 (S11). The controller 29 instructs the copy unit 30 to copy a designated set of the data 33 and 34 and the snapshot 35 from the replication data storage unit 32 into the business data storage unit 31 (S12). The copy unit 30 copies the designated set of the data 33 and 34 and the snapshot 35 from the replication data storage unit 32 into the business data storage unit 31 (S13).

The control unit 15 instructs the OS 18 to recognize the data 33 and 34 and the snapshot 35 copied into the business data storage unit 31 as a file system (S14). The OS 18 recognizes the data 33 and 34 and the snapshot 35 stored in the business data storage unit 31 as the file system 19 (S15).

The control unit 15 instructs the file system 19 to perform the rollback (S16). In accordance with the instructions from the control unit 15, the file system 19 performs the rollback based on the data 33 and 34 and the snapshot 35 (S17).

Figure 6:
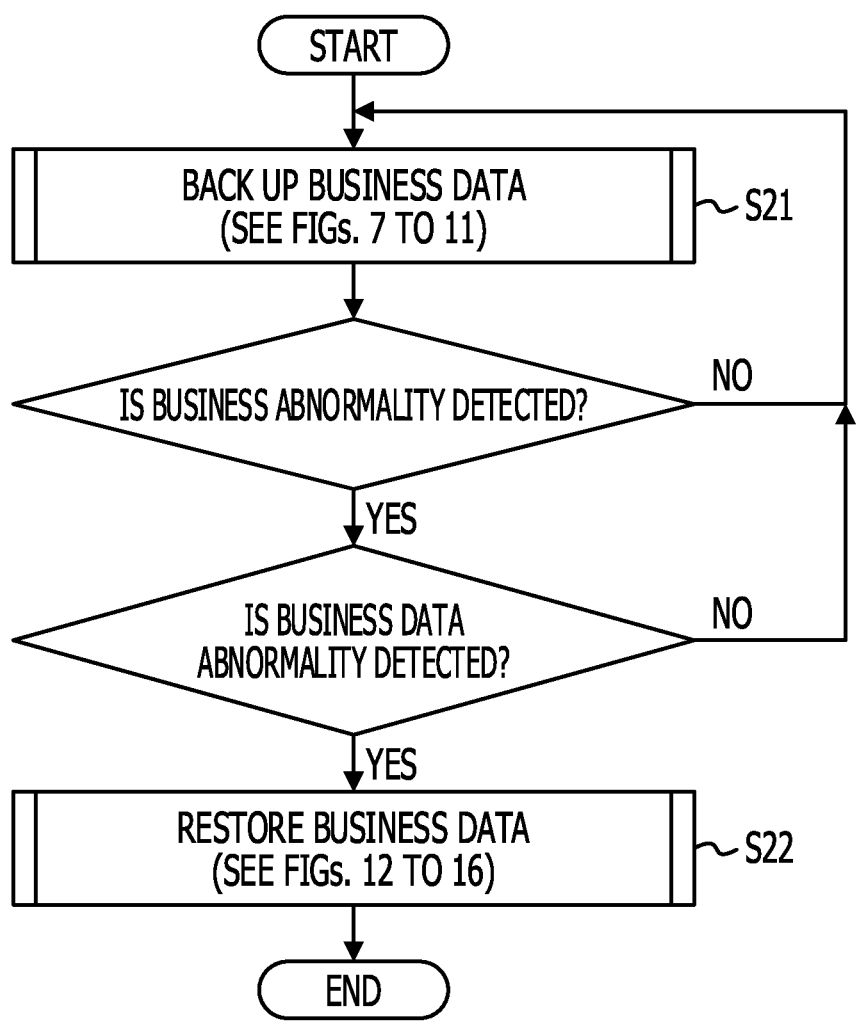
FIG. 6 illustrates an example of a backup restoration process.

At the time of the restoration, guaranteed data may be restored by performing the rollback based on the data and the snapshot after the backup data has been copied by the copy function of the disk array apparatus 28. The backup restoration may be performed by the copy function of the disk array apparatus 28 without using a server resource, such as the CPU. FIG. 6 illustrates an example of a backup restoration process. The business data is backed up (S21). When an business abnormality is detected, detection of an abnormality of the business data is performed. When the abnormality of the business data is detected, the business data is restored (S22). The detection of the business abnormality and the abnormality of the business data may be taken into the control unit 15.

Figure 7:
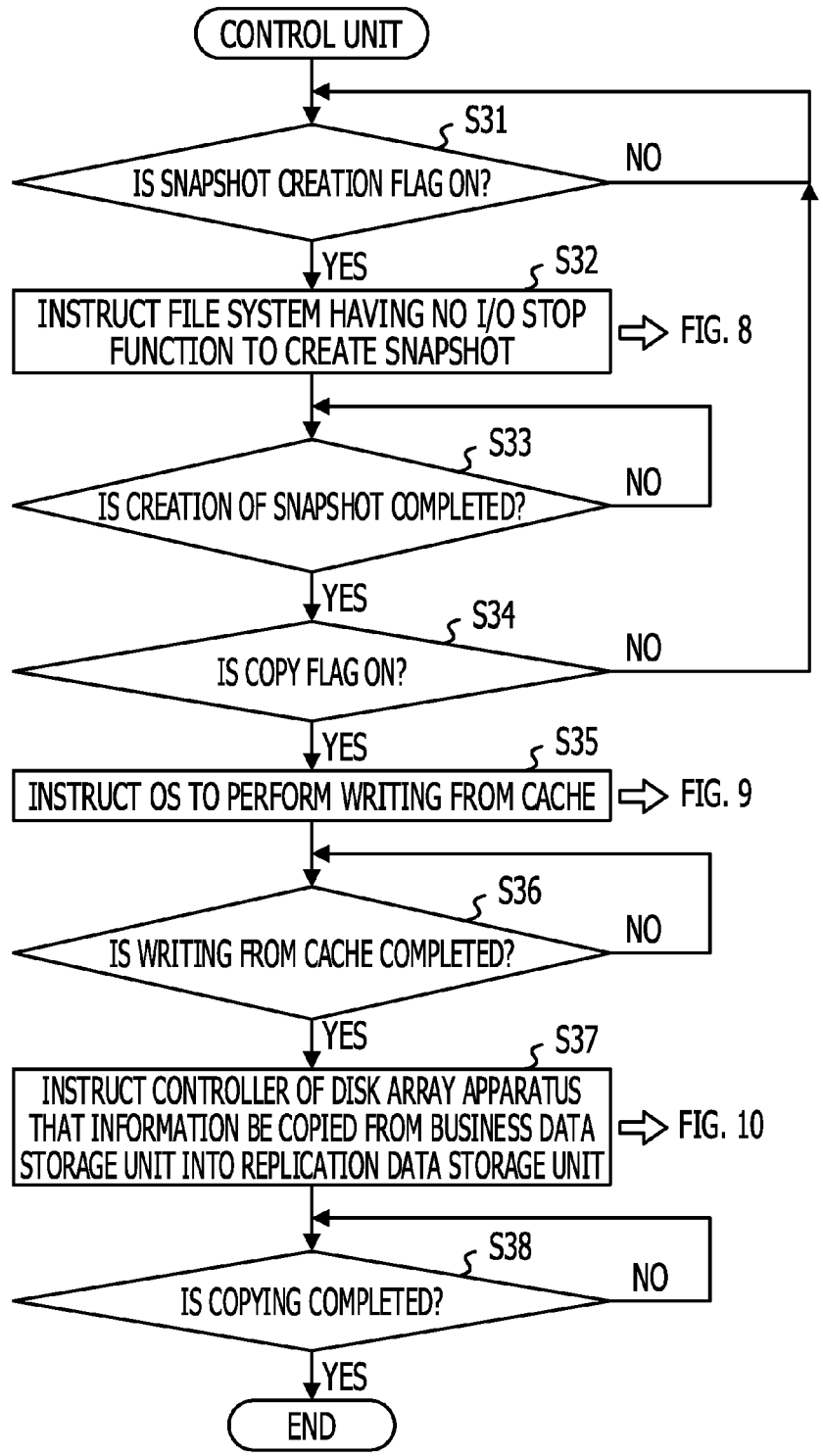
FIG. 7 illustrates an example of a process of a control unit.
Figure 8:
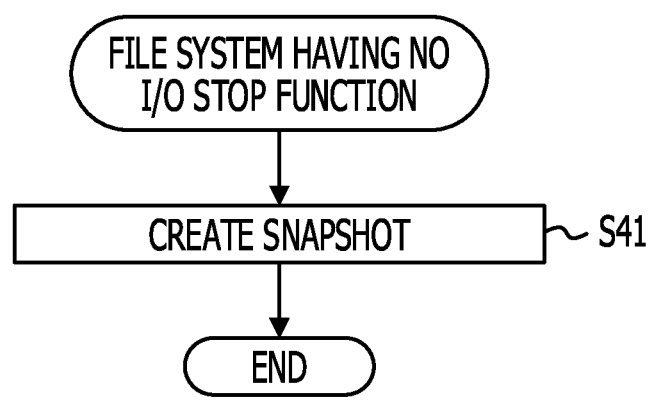
FIG. 8 illustrates an example of a process of a file system.
Figure 9:
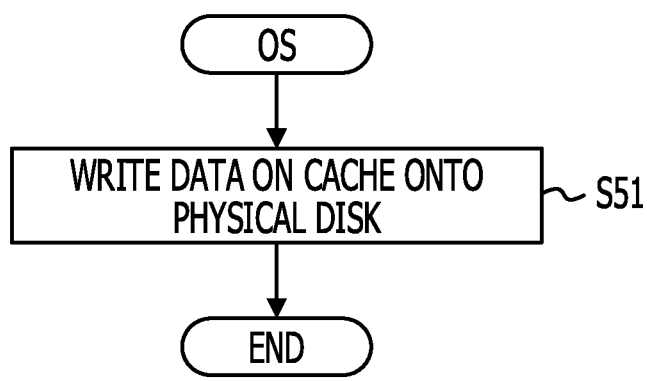
FIG. 9 illustrates an example of a process of an operating system (OS)
Figure 10:
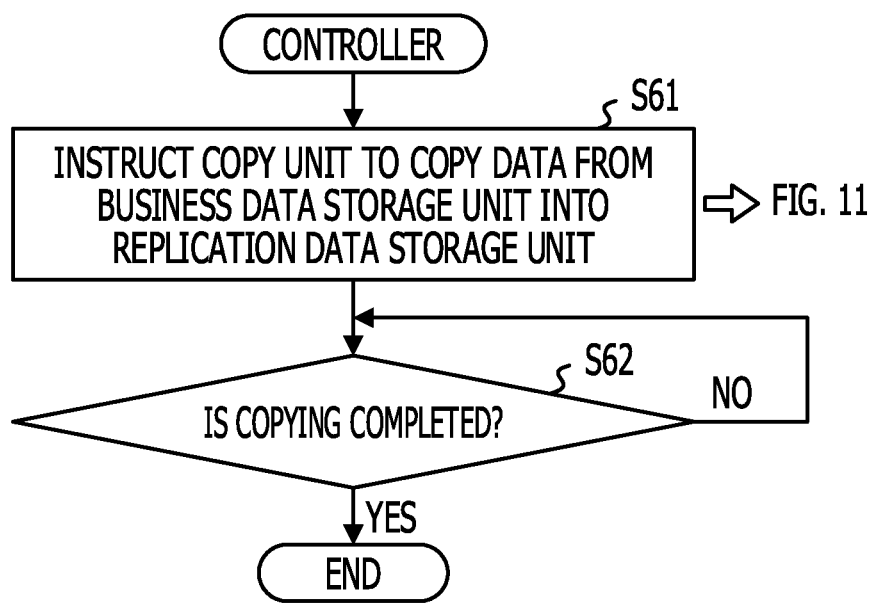
FIG. 10 illustrates an example of a process of a controller.
Figure 11:
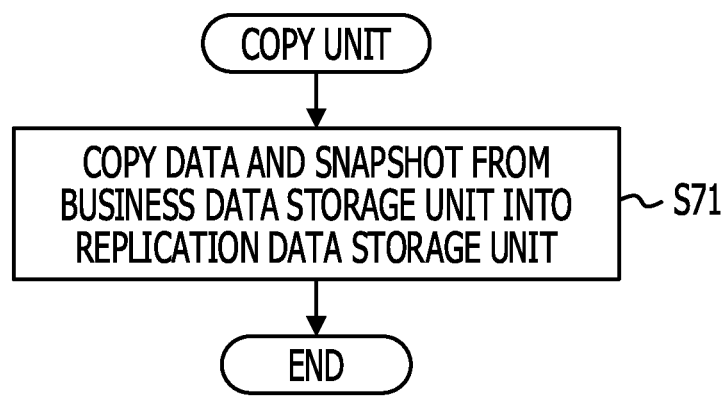
FIG. 11 illustrates an example of a process of a copy unit.

FIG. 7 illustrates an example of a process of a control unit. The process illustrated in FIG. 7 may correspond to the process performed by the control unit in operation S21 illustrated in FIG. 6. FIG. 8 illustrates an example of a process of a file system. The process illustrated in FIG. 8 may correspond to the process performed by the file system in operation S21 illustrated in FIG. 6. FIG. 9 illustrates an example of a process of an OS. The process illustrated in FIG. 9 may correspond to the process performed by the OS in operation S21 illustrated in FIG. 6. FIG. 10 illustrates an example of a process of a controller. The process illustrated in FIG. 10 may correspond to the process performed by the controller in operation S21 illustrated in FIG. 6. FIG. 11 illustrates an example of a process of a copy unit. The process illustrated in FIG. 11 may correspond to the process performed by the copy unit in operation S21 illustrated in FIG. 6.

In FIG. 7, the determination unit 16 of the control unit 15 reads the entry identification information set for the schedule management item 41 of the schedule information 17 stored in the storage device, and reads the schedule entry 42 corresponding to the entry identification information. The determination unit 16 determines whether the snapshot flag is on in the "flag" 44 included in the read schedule entry 42 (S31). When the snapshot flag is on ("Yes" in S31), the determination unit 16 determines a timing for creating a snapshot in accordance with the "start time" 45 included in the read schedule entry 42. When it is determined that the start time has arrived by comparing the "start time" 45 with a current time, the determination unit 16 notifies the control unit 15 of the timing for creating the snapshot.

In accordance with the notification from the determination unit 16, the control unit 15 instructs the file system 19 having no I/O stop function to create the snapshot (S32). For example, as illustrated in FIG. 8, the file system 19 having no I/O stop function creates the snapshot and the OS 18 outputs the snapshot to the business data storage unit 31 (S41). When the creation of the snapshot is completed, the file system 19 notifies the control unit 15 of the completion of the creation of the snapshot.

Since the data on the file system 19 may remain on the cache 22, the process described next is performed in the control unit 15 after the completion of the creation of the snapshot ("Yes" in S33). For example, the determination unit 16 determines whether the copy flag in the "flag" 44 included in the read schedule entry 42 is on or not (S34). When the copy flag is on ("Yes" in S34), the determination unit 16 determines a timing for writing the data on the cache 22 onto the physical disk in accordance with the "start time" 45 included in the read schedule entry 42. When it is determined that the start time has arrived by comparing the "start time" 45 with the current time, the determination unit 16 notifies the control unit 15 of the timing for writing the data on the cache 22 onto the physical disk.

In accordance with the notification from the determination unit 16, the control unit 15 instructs the OS 18 to write the data on the cache 22 onto the physical disk (S35). For example, as illustrated in FIG. 9, the OS 18 performs the process of writing the data on the cache 22 onto the physical disk (S51). All the data on the cache 22 may be written out.

When the writing from the cache is completed ("Yes" in S36), the control unit 15 instructs the controller 29 of the disk array apparatus 28 to copy the information stored in the business data storage unit 31 into the replication data storage unit 32 (S37). As illustrated in FIG. 10, the controller 29 instructs the copy unit 30 to copy the data including the data written from the cache 22 and the snapshot, which are stored in the business data storage unit 31, into the replication data storage unit 32 (S61). As illustrated in FIG. 11, the copy unit 30 of the disk array apparatus 28 copies the data including the data written from the cache 22 and the snapshot, which are stored in the business data storage unit 31, into the replication data storage unit 32 (S71). When the copying is completed, the copy unit 30 notifies the controller 29 of the completion of the copying. The controller 29 notifies the control unit 15 of the completion of the copying (S62). When the control unit 15 receives the notification of the completion of the copying from the controller 29 ("Yes" in S38), the process ends.

In the file system having no I/O stop function and the file system having an I/O stop function, the copying may be performed without stopping the I/O.

Figure 12:
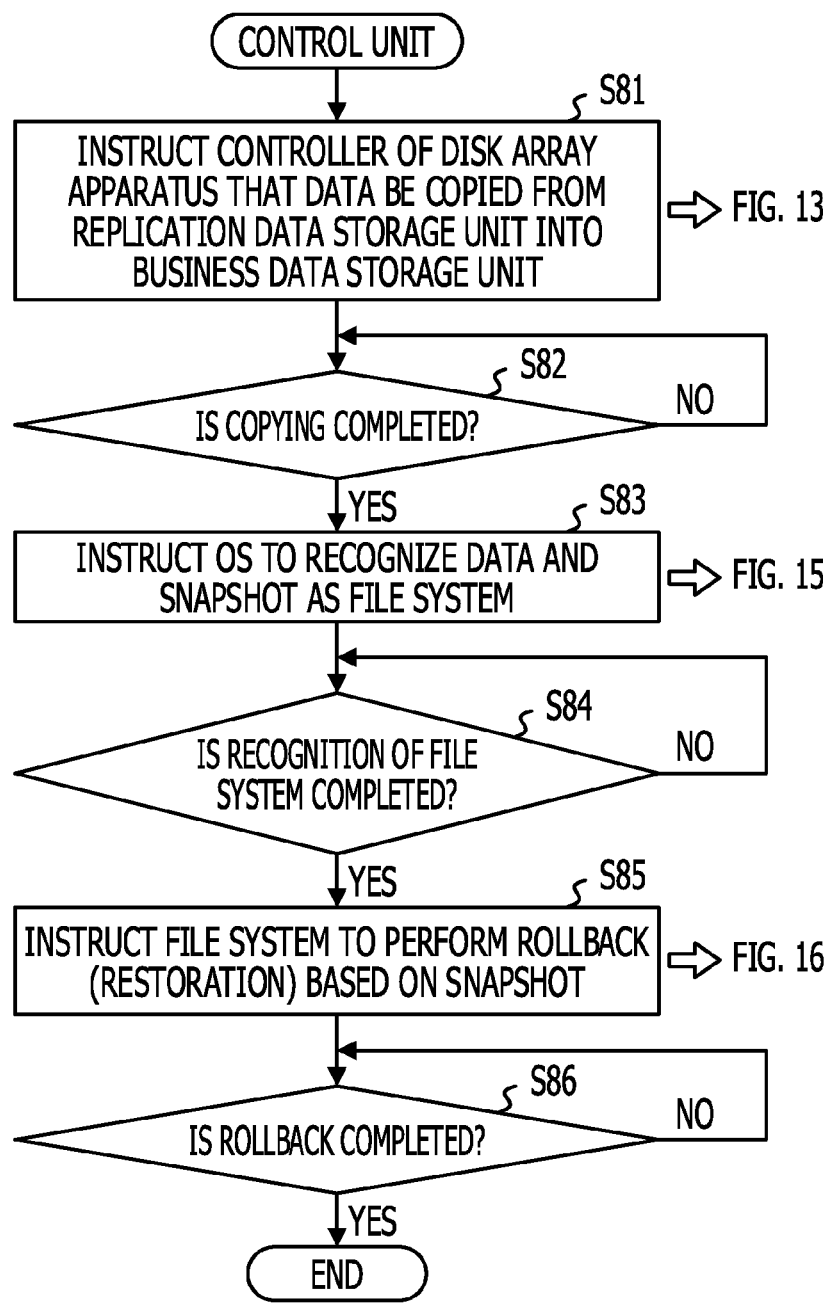
FIG. 12 illustrates an example of a process of a control unit.
Figure 13:
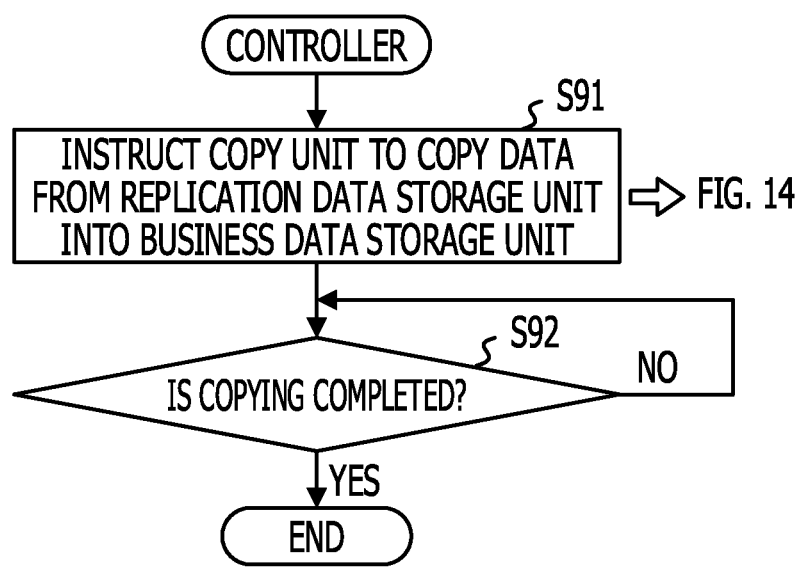
FIG. 13 illustrates an example of a process of a controller.
Figure 14:
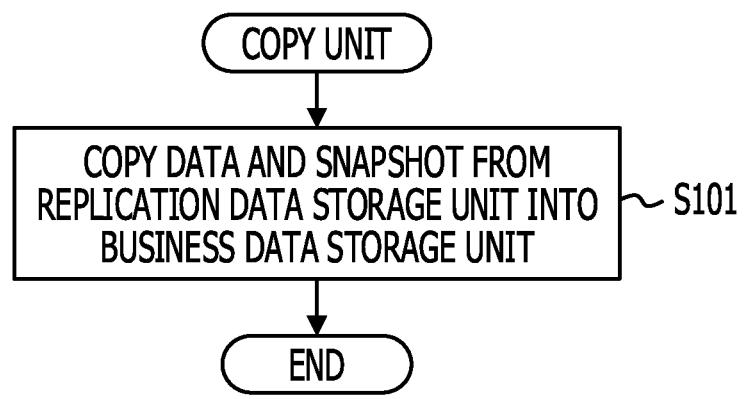
FIG. 14 illustrates an example of a process of a copy unit.
Figure 15:
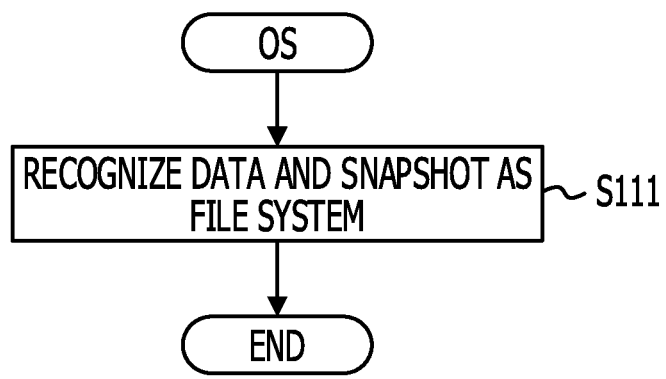
FIG. 15 illustrates an example of a process of an OS.
Figure 16:
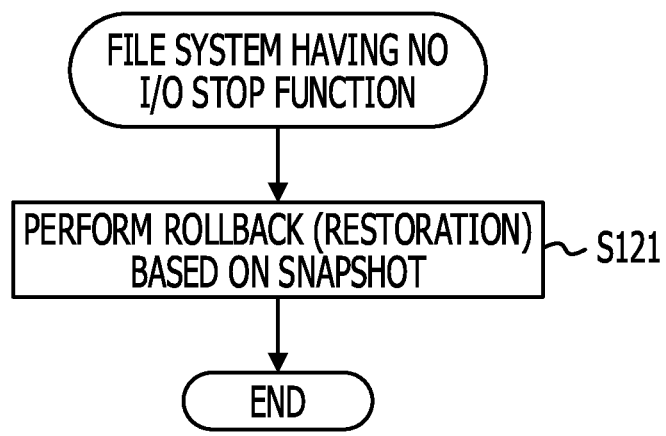
FIG. 16 illustrates an example of a process of a file system.

FIG. 12 illustrates an example of a process of a control unit. The process illustrated in FIG. 12 may correspond to the process performed by the control unit in operation S22 illustrated in FIG. 6. FIG. 13 illustrates an example of a process of a controller. The process illustrated in FIG. 13 may correspond to the process performed by the controller in operation S22 illustrated in FIG. 6. FIG. 14 illustrates an example of a process of a copy unit. The process illustrated in FIG. 14 may correspond to the process performed by the copy unit in operation S22 illustrated in FIG. 6. FIG. 15 illustrates an example of a process of an OS. The process illustrated in FIG. 15 may correspond to the process performed by the OS in operation S22 illustrated in FIG. 6. FIG. 16 illustrates an example of a process of a file system. The process illustrated in FIG. 16 may correspond to the process performed by the file system having no I/O stop function in operation S22 illustrated in FIG. 6.

In FIG. 12, the control unit 15 instructs the controller 29 of the disk array apparatus 28 to copy the replicated data from the replication data storage unit 32 into the business data storage unit 31 (S81). As illustrated in FIG. 13, the controller 29 of the disk array apparatus 28 instructs the copy unit 30 to copy the replicated data from the replication data storage unit 32 into the business data storage unit 31 (S91). As illustrated in FIG. 14, the copy unit 30 of the disk array apparatus 28 copies the data and the snapshot of the replication data storage unit 32 into the business data storage unit 31 (S101). For example, when the data and the snapshot of a previous day are present on the replication data storage unit 32, the copy unit 30 copies the data and the snapshot into the business data storage unit 31. When the copying is completed, the copy unit 30 notifies the controller 29 of the completion of the copying. When the controller 29 receives the notification of the completion of the copying ("Yes" in S92), the controller 29 notifies the control unit 15 that the controller 29 has received the notification of the completion of the copying.

After the disk array apparatus 28 has completed copying the data and the snapshot from the replication data storage unit 32 into the business data storage unit 31 ("Yes" in S82), for example, the control unit 15 instructs the OS 18 to recognize the copied data and snapshot in the disk as the file system 19 (S83). As illustrated in FIG. 15, the OS 18 recognizes the data and the snapshot of the business data storage unit 31 as the file system 19 (S111).

After the data and the snapshot of the business data storage unit 31 have been recognized as the file system 19 ("Yes" in S84), for example, the control unit 15 instructs the file system 19 having no I/O stop function to perform the rollback (restoration) based on the data and the snapshot (S85). As illustrated in FIG. 16, the file system 19 having no I/O stop function performs the rollback (restoration) based on the data and the snapshot (S121). When the file system 19 having no I/O stop function completes the rollback based on the data and the snapshot ("Yes" in S86), the process ends.

When the data is backed up in the server 12, the backup (online backup), may be performed without stopping any business or application. When the data is backed up in the server 12, the backup may be performed without using a resource of the server 12, such as the CPU. The consistency of the data restored in the server 12 may be secured.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processor coupled to a storage apparatus that stores information, comprising:
a processor configured to execute a program; and
a memory configured to store the program,
wherein the processor performs, based on the program, operations to:
read schedule information;
check whether a snapshot flag in the schedule information is set;
compare, when the snapshot flag is set, a current time with a start time corresponding to the snapshot flag in the schedule information;
create, when it is determined that the start time corresponding to the snapshot flag has arrived based on a first comparison result, a snapshot of a file system without stopping an input and an output to and from the storage apparatus and output the snapshot to the storage apparatus;
check, after creating the snapshot, whether a copy flag in the schedule information is set;
compare, when the copy flag is set, a current time with a start time corresponding to the copy flag in the schedule information;
write, when it is determined that the start time corresponding to the copy flag has arrived based on a second comparison result, second information stored in cache memory onto first information that is stored in the storage apparatus and is managed by the file system after the snapshot has been created; and
instruct, after writing the second information, the storage apparatus to create a replication of the snapshot and the first information onto which the second information is written.

2. An information processor coupled to a storage apparatus that stores information, comprising:
a processor configured to execute a program; and
a memory configured to store the program,
wherein the processor performs, based on the program, operations to:
check whether a snapshot flag in the schedule information is set;
compare, when the snapshot flag is set, a current time with a start time corresponding to the snapshot flag in the schedule information;
create, when it is determined that the start time corresponding to the snapshot flag has arrived based on a first comparison result, a snapshot of a file system for first information stored in a first data storage of the storage apparatus without stopping an input and an output to and from the storage apparatus;
output the snapshot to the first data storage;
check, after creating the snapshot, whether a copy flag in the schedule information is set;
compare, when the copy flag is set, a current time with a start time corresponding to the copy flag in the schedule information;
write, when it is determined that the start time corresponding to the copy flag has arrived based on a second comparison result, second information stored in cache memory into the first data storage; and
instruct, after writing the second information, the storage apparatus to copy the snapshot, the first information, and the second information stored in the first storage to a second storage of the storage apparatus.

3. A backup method, comprising:
reading schedule information;
checking whether a snapshot flag in the schedule information is set;
comparing, when the snapshot flag is set, a current time with a start time corresponding to the snapshot flag in the schedule information;
creating, by a computer, when it is determined that the start time corresponding to the snapshot flag has arrived based on a first comparison result, a snapshot of a file system that manages first information stored in a storage apparatus without stopping an input and an output to and from the storage apparatus and output the snapshot to the storage apparatus;

checking, after creating the snapshot, whether a copy flag in the schedule information is set;

comparing, when the copy flag is set, a current time with a start time corresponding to the copy flag in the schedule information;

writing, when it is determined that the start time corresponding to the copy flag has arrived based on a second comparison result, second information stored in a cache memory onto the first information stored in the storage apparatus after the snapshot has been created; and instructing, after writing the second information, the storage apparatus to create a replication of the snapshot and the first information onto which the second information is written.

4. The information processor according to claim 1, wherein
the schedule information includes one or more entries in which the snapshot flag, the copy flag, and the start time are associated with each other.

5. The information processor according to claim 1,
wherein the processor recognizes the snapshot and one of the first information and the second information as the file system and executes rollback based on the snapshot and one of the first information and the second information.

6. The information processor according to claim 1, wherein the file system is a Zettabyte File System (ZFS).

7. The information processor according to claim 2, wherein the copy is performed using a copy function of the storage apparatus.

8. The information processor according to claim 2, wherein the first storage is a physical disk and the second storage is a replication data storage.

9. The information processor according to claim 2, wherein the processor instructs the storage apparatus to copy the snapshot and one of the first information and the second information stored in the second storage to the first storage and recognizes the snapshot and one of the first information and the second information stored in the first storage as the file system.

10. The information processor according to claim 2, wherein the schedule information includes one or more entries in which the snapshot flag, the copy flag, and the start time are associated with each other.

11. The backup method according to claim 3, further comprising:
recognizing the snapshot and the first information onto which the second information is written as the file system; and
executing a rollback based on the snapshot and the first information onto which the second information is written.

12. The backup method according to claim 3, wherein the schedule information includes one or more entries in which the snapshot flag, the copy flag, and the start time are associated with each other.

13. The information processor according to claim 9, wherein the processor executes a rollback based on the snapshot and one of the first information and the second information.

* * * * *